H. E. THARP.
AUTOMATIC SIGNAL.
APPLICATION FILED SEPT. 14, 1917.
1,298,420. Patented Mar. 25, 1919.
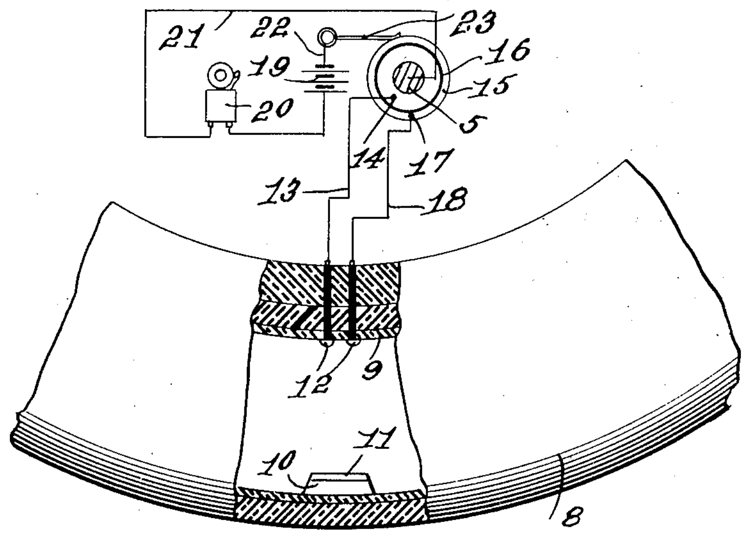
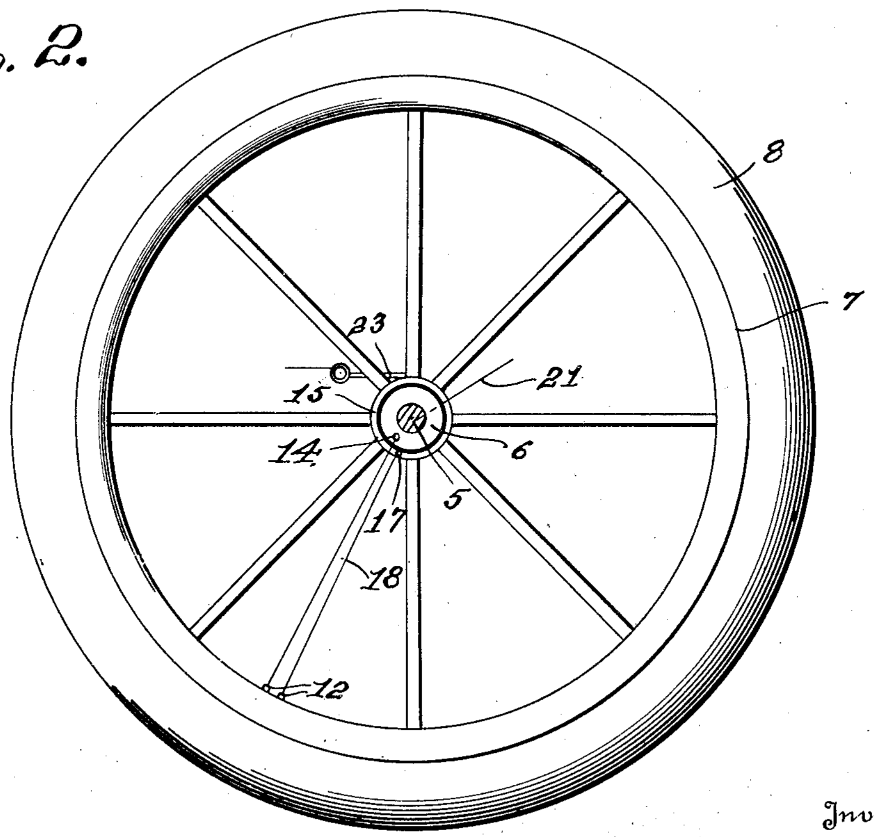
Inventor
H. E. Tharp.
Witness
O. M. Cook
E. L. Mueller
By Chandlee & Chandlee
Attorney

UNITED STATES PATENT OFFICE.

HARVEY E. THARP, OF SMITH CENTER, KANSAS, ASSIGNOR OF ONE-HALF TO JESSIE O. BUZZARD, OF SMITH CENTER, KANSAS.

AUTOMATIC SIGNAL.

1,298,420. Specification of Letters Patent. Patented Mar. 25, 1919.

Application filed September 14, 1917. Serial No. 191,374.

*To all whom it may concern:*

Be it known that I, Harvey E. Tharp, a citizen of the United States, residing at Smith Center, in the county of Smith, State of Kansas, have invented certain new and useful Improvements in Automatic Signals; and I do hereby declare the following to be a full, clear, and exact description of the invention, such as will enable others skilled in the art to which it appertains to make and use the same.

This invention is an improvement in signals and has particular reference to a signal for pneumatic tires.

An object of the invention is to provide an improved signal of simple and inexpensive construction and including normally separated contacts carried by the inner tube of the pneumatic tire in such a manner that when the tire becomes deflated to a certain degree the contacts will engage and close a circuit to actuate the signal.

The inventive idea involved is capable of receiving a variety of mechanical expressions, one of which, for the purpose of illustrating the invention, is shown in the accompanying drawing, wherein:

Figure 1 is a fragmentary side elevation of a vehicle wheel and pneumatic tire therefor showing the invention applied thereto, and Fig. 2 is a longitudinal sectional view through the wheel and tire with the signal proper shown diagrammatically.

In the drawing, the numeral 5 indicates a metallic axle of a vehicle upon which is mounted the hub 6 of a vehicle wheel 7 carrying the usual pneumatic tire 8 including the inner tube 9.

Preferably secured to the interior of the inner tube and to the tread portion thereof is a base member or plug 10 of insulated material and carrying a metallic contact plate 11 adapted to be spaced, when the tire is inflated, from a pair of spaced contact pins 12 extending through the rim of the wheel and the rim portion of the inner tube into the interior thereof. From the relative arrangement of the contact plate 11 and pins 12 it will be apparent that when the tire becomes deflated the plate 11 will approach and finally engage the inner ends of the pins 12 and bridge the space therebetween whereby to close a circuit.

The signaling mechanism preferably comprises a wire 13 having one end connected to one of the contact pins 12 and its other end secured to a binding post 14 on the metallic hub 6. Fixed to said hub is a metallic band 15 spaced from the hub by the insulation 16 and carrying a binding post 17 to which is secured one end of a wire 18 the other end of which is secured to the other contact pin 12.

The vehicle supports, at any convenient place thereon, a battery 19 and an electric bell 20 or other suitable alarm electrically connected to the metallic axle 5 by a wire 21. The battery 19 is connected by a wire 22 to a brush 23 one end of which is in constant engagement with the metallic band 15 so that when the contacts 11 and 12 are in engagement the circuit will be closed through the construction just described and the alarm sounded.

What I claim as my invention is:—

The combination with a vehicle wheel having an inflatable tire including an inner tube; of a movable contact plate supported interiorly of the inner tube by the tread portion thereof, relatively stationary and spaced contact pins extending through the rim of the wheel and the inner tube and adapted to be engaged and the space therebetween bridged by said contact plate when the tire becomes deflated whereby to operate a signal mechanism.

In testimony whereof, I affix my signature in the presence of two witnesses.

HARVEY E. THARP.

Witnesses:
J. C. McManus,
J. B. Davidson.